Patented Mar. 21, 1944

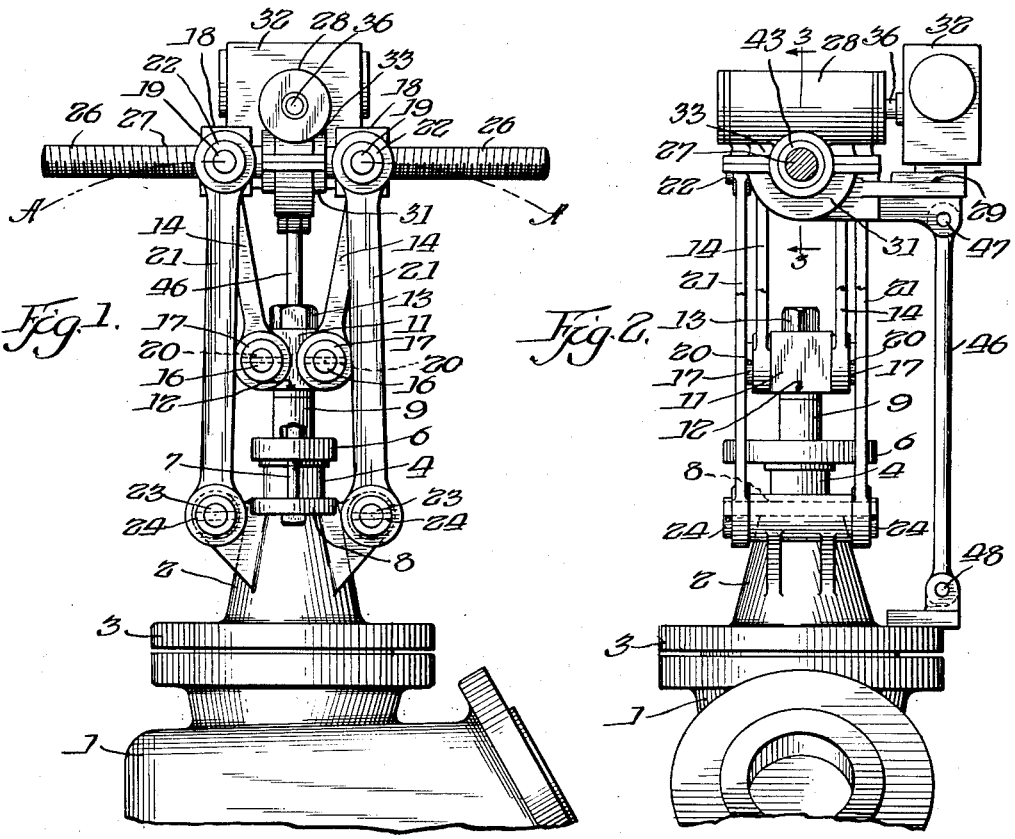

2,344,594

UNITED STATES PATENT OFFICE 2,344,594

MOTOR OPERATED TOGGLE VALVE

Corwin W. Bryant, Downers Grove, Ill., assignor to Crane Co., Chicago, Ill., a corporation of Illinois Application January 23, 1942, Serial No. 427,853

7 Claims. (Cl. 74—89)

This invention relates generally to valve actuating means or like mechanisms and specifically to an improved toggle operating mechanism for motor operated valves and the like.

Previous toggle mechanisms for motor operated valves have employed the motor units or other means for power operation positioned at one end of the toggle shaft. This has necessitated the use of bulky and expensive support means which at best have not been entirely satisfactory in operation. Attempts to eliminate some of the bulk and expense by hanging or connecting the motor unit directly to one end of the toggle shaft in such a manner that the toggle shaft itself has borne the weight of the motor unit have been entirely unsuccessful. This has been largely due to the fact that the resulting unsymmetrical loading of the shaft has caused a substantial degree of bending or distortion of the shaft, especially in the nearly closed position, so that there was binding between the threaded toggle blocks and the threaded portions of the toggle shaft thereby rendering the effective closing of the valve practically impossible.

It has been my primary purpose to eliminate the costly support means above mentioned for the motor unit of a toggle operated valve or the like and yet accomplish the symmetrical loading of the toggle shaft which is essential to efficient operation. I have carried this purpose out by mounting the motor unit or other power operating means onto the center of the toggle shaft rather than on the ends as has heretofore been found impractical.

In conjunction with the primary purpose above outlined, another object of my invention has been to provide the motor with an extension means adapted to limit the rotational movement of the motor unit about the toggle shaft axis when in operation.

Other objects and advantages of my invention will become more readily apparent in the following detailed description considered with the drawing, in which Fig. 1 is an exterior side view of one form of my invention as it may be employed in connection with a valve.

Fig. 2 is an exterior end elevation view of the device shown in Fig. 1, some parts broken away for a clearer showing of the motor mounting.

Fig. 3 is a fragmentary sectional view taken along the line 3—3 of Fig. 2.

Throughout the drawing like reference characters refer to like parts and it should be understood that the specific toggle mechanism shown is only by way of illustration and not by way of limitation.

Referring now to the drawing in greater detail, a valve casing or housing 1 is illustrated having the bonnet portion 2 connected at the flanged joint 3 by screws or threads or in any other suitable manner. The bonnet 2 is equipped with the usual gland 4, gland follower 6 and packing bolts 7, the latter being removably engaged in apertures formed in the radially extending bonnet lugs 8. A stem 9 is journally guided within the bonnet for reciprocating movement, having its lower end portion connected to a valve disc (not shown) within the body 1 and having its upper end portion formed to interlockably engage the cross member or crosshead 11 between the shoulder 12 and the nut 13 which is threadedly attached to the stem. Pairs of operating arms 14 are pivotally attached to each side of the cross member 11 and are pivotally mounted upon pins 16 which are fitted within horizontally extending apertures formed within the cross member 11. Obviously another modification of this construction would lie in having the pins 16 formed integral with the cross member 11 as machined cylindrical lugs. To prevent the arms 14 from slipping outward off the ends of the pins 16, annular rings 17 are fitted over the pins exteriorly of the arms 14 and held in place by any suitable means, as for instance by auxiliary pins 20 fitted into holes drilled through the pins 16 and the annular rings 17. Each pair of operating arms 14 is similarly pivotally connected to one of the toggle blocks 18, the upper end portions of the operating arms 14 being drilled to fit over the pins 19 which latter members are preferably formed integral with the blocks 18. A double pair of supporting arms 21 are pivotally attached at their upper end portions to the pins 19 in the same manner and are maintained in place by the annular rings 22 which latter members may be locked in place in any suitable manner, as for instance, in the same way as the annular members 17. The lower end portions of the supporting arms 21 are apertured and pivotally attached to the pins 23 and held in place by the annular members 24 in like fashion.

The end portions 26 of the toggle shaft 27 are oppositely threaded in the usual manner and the toggle blocks 18 are internally threaded to cooperate with the threaded portions of the toggle shaft in such a manner that when the toggle shaft 27 is rotated, the blocks 18 will be caused to move together or to move apart, depending upon the direction of rotation of the shaft. Arcs A—A struck from the centers of the pins 23 at the lower end of the support arms 21, indicate the path of the upper end portions of the support arms 21 in moving from the fully open to the fully closed position, or vice versa; the arcs A—A illustrate also the vertical movement of the shaft 27 during operation.

To provide for power operated rotation of the shaft 27, a gear box generally designated 28 is preferably installed upon the center of the shaft 27 between the blocks 18, the inside details of the gear box 28 being shown in Fig. 3. An extended platform 29 is provided integral with the lower half 31 of the casing and is used for mounting suitable power means 32 which latter may be either an electric motor, a pneumatic pressure motor or even a cylinder and piston associated with a rack for producing rotary movement. The upper half 33 of the casing has journaled therewithin a worm 34, as shown more clearly in Fig. 3, the worm 34 being operatively connected with the power source 32 through the extension or shaft 36. The worm 34 is operatively meshed with a worm wheel 37 which, as shown, may be keyed to the shaft 27 by the key 38; alternatively, a set screw or other means may be employed to prevent rotation of the worm wheel 37 with respect to the shaft 27. Endwise movement of the worm wheel 37 with respect to the shaft 27 is restrained in a frictionless manner by bearings 39 which are interposed between the shoulders 41 formed on the shaft 27 and the inner shoulders 42 formed within the gear box 28. Grease or oil may be retained within the gear box 28 in any desirable manner; in Fig. 3 I have shown one preferred manner wherein annularly shaped discs made preferably of spring material and designated 43 are fitted within annular depressions 44 formed in the casing, the inner edge of the annular discs 43 being adapted to bear resiliently against the outer surface of the toggle shaft 27 thereby retaining grease or oil and preventing the entry of dust and other undesirable matter from the outside.

In order to hold the gear box and motor unit firmly against rotation about the axis of the shaft 27 when in operation, a pivoted rod or balance link 46 is provided, pivotally connecting the platform 29 and the bonnet 2 by means of pins 47 and 48; the upper end of the balance link 46 need not necessarily be pivotally connected with the platform 29 but may be pivotally connected with any other portion of the power unit 32 or the gear casing 28 as desired, and likewise it is not essential that the lower end portion of the balance link be connected to the bonnet of the valve but it may be pivotally connected to any other fixed portion of the valve, or to any other fixed member whether on the valve or not.

In operation, the device shown in the drawing is in the following manner: Actuation of the motor 32, usually from a remote location, causes the shaft 36 connected to the worm 34 to rotate. Let it be assumed that the direction of rotation is in the opening direction. This manner of operation causes the toggle shaft 27 to rotate within the blocks 18, screwing the latter outward toward the ends of the toggle shaft. As each of the blocks 18 move outward along a path indicated by the arcs A—A the operating arm 14 will be lifted, being pivoted about the pins 16 and 19. As the motor unit 32, gear case 28, shaft 27 and the related parts move downward, they will pivot about the pin 47 which in turn will be drawn slightly inward toward the vertical centerline of the valve, thus causing the balance link 46 to pivot slightly about the pin 48.

Thus, by providing a gear box 28 which is extremely compact, it has been found necessary to utilize only a relatively small portion of the center of the toggle shaft 27, thereby enabling the blocks 18 to be drawn closely together in the seating position when the greatest stresses are applied to the parts, and, because the blocks are relatively closely spaced in this position, the weight of the motor unit, gear box, etc., is inconsequential in causing undesirable bending moments which might interfere with the seating operation upon downward movement of the stem 9. It is therefore seen that previous objections which have been raised in connection with mounting the motor unit directly onto the toggle shaft have been overcome.

In summary, the following principal advantages have been realized by suspending the motor unit, the gear box and the like from the center of the shaft 27 and incorporating the balancing link 46 to restrain the motor 32 against rotation about the axis of the shaft:

1. No binding can arise in operation as heretofore has been common in toggle operated valves, because all sliding connections and unsymmetrical loading arrangements have been entirely eliminated in the instant invention.

2. An absolute minimum of parts is required as compared with previous devices of this nature.

3. Due to the relatively few number of parts, costs and machining operations may be kept at a minimum.

4. Relatively low weight and bulk in contrast to previous devices which have incorporated massive yokes, guides and supporting members; this bulk and weight reduction is particularly significant in naval and aircraft use where a high premium is placed upon the effective load-carrying ability of a ship or plane.

It will be obvious to those who are skilled in the art that the detailed form of the various parts may be changed considerably depending upon the type of valve or other device with which the toggle arrangement is used and the service for which it is recommended. The motor unit particularly may take many forms other than that shown and this is equally applicable to the gear casing.

Accordingly, the scope of this invention should be measured by the terms of the claims appended hereto and not by the particular illustrations used to describe the application of preferred forms of my invention.

I claim:

1. In a toggle mechanism for the operation of a valve or the like, a floating toggle shaft, power driving means connected to and supported on the center of said toggle shaft for effecting rotation thereof, the said driving means having lever means for limiting the rotational movement of said power means about the axis of said toggle shaft.

2. A toggle device for the power actuation of valves and the like, a housing therefor, a floating toggle shaft mounted above the said housing, rotating means for the said shaft operatively supported on a central portion thereof, means providing for a floating connection between the said rotating means and the said housing to limit the movement of said rotating means about the axis of said toggle shaft.

3. In a toggle device for the actuation of a valve or the like, a housing therefor, a rotatable floating toggle shaft mounted by pivotal means upon the said housing, actuating means mounted on and operatively engaging a central portion of said toggle shaft for effecting rotation thereof, pivotable lever means connected with said housing and said actuating means and adapted to limit the rotation of said latter means about the axis of said toggle shaft.

4. A toggle operated valve or the like comprising a casing, a stem journaled therewithin, a reciprocably floating toggle shaft having oppositely threaded end portions, toggle blocks threadedly engaging the said toggle shaft, operating arms pivotally engaging the said stem and the said toggle blocks, supporting arms pivotally engaging the said casing and the said toggle blocks, the said stem being reciprocably movable upon pivotal movement of the said supporting arms, power driving means supported on the center of the said toggle shaft for effecting rotation thereof and reciprocably movable predeterminedly therewith.

5. A toggle operated valve comprising a casing, a stem therefor reciprocably journaled therewithin, a floating toggle shaft having oppositely threaded end portions, toggle blocks threadedly engaging the threaded portions of said toggle shaft, pivotally mounted operating arms connecting said toggle blocks with the said stem, pivotally mounted supporting arms connecting the said toggle blocks with the said casing, means movably associated with the center of said toggle shaft for effecting rotation thereof, a fixed member, a member pivotally mounted at both ends, the said means associated with the said toggle shaft being connected with the said fixed member by the said pivotally mounted member.

6. A toggle operated valve or the like comprising a casing, a stem journaled therewithin, a reciprocably floating toggle shaft having oppositely threaded end portions, toggle blocks threadedly engaging the said toggle shaft, operating arms pivotally engaging the said stem and the said toggle blocks, supporting arms pivotally engaging the said casing and the said toggle blocks, power driving means supported on the center of the said toggle shaft for effecting rotation thereof and reciprocably movable predeterminedly therewith, balance link means connected to the said casing and power means.

7. A toggle operated valve or the like comprising a casing, a stem journaled therewithin, a reciprocably floating toggle shaft having oppositely threaded end portions, toggle blocks threadedly engaging the said toggle shaft, operating arms pivotally engaging the said stem and the said toggle blocks, supporting arms pivotally engaging the said casing and the said toggle blocks, power driving means supported on the center of the said toggle shaft for effecting rotation thereof and reciprocably movable predeterminedly therewith, balance link means positioned intermediate the said casing and power means, said balance link being pivotally supported at its end limits by the said casing and power driving means respectively whereby the said driving means is permitted limited movement reciprocably with the said toggle shaft but is prevented from rotating with the said toggle shaft.

CORWIN W. BRYANT.